(12) United States Patent
Pinel

(10) Patent No.: US 12,210,148 B2
(45) Date of Patent: Jan. 28, 2025

(54) MULTI-PLANE CONVERSION DEVICE

(71) Applicant: CAILabs, Rennes (FR)

(72) Inventor: Olivier Pinel, Rennes (FR)

(73) Assignee: CAILABS, Rennes (FR)

( * ) Notice: Subject to any disclaimer, the term of this patent is extended or adjusted under 35 U.S.C. 154(b) by 0 days.

(21) Appl. No.: 18/520,059

(22) Filed: Nov. 27, 2023

(65) Prior Publication Data

US 2024/0103266 A1  Mar. 28, 2024

Related U.S. Application Data

(62) Division of application No. 16/975,673, filed as application No. PCT/FR2019/050433 on Feb. 26, 2019, now Pat. No. 11,828,935.

(30) Foreign Application Priority Data

Feb. 26, 2018 (FR) ...................................... 1851664

(51) Int. Cl.
*G02B 27/00* (2006.01)
*G02B 6/28* (2006.01)
*G02B 17/00* (2006.01)

(52) U.S. Cl.
CPC ....... *G02B 27/0012* (2013.01); *G02B 6/2817* (2013.01); *G02B 17/004* (2013.01)

(58) Field of Classification Search
None
See application file for complete search history.

(56) References Cited

U.S. PATENT DOCUMENTS 9,250,454 B2    2/2016  Morizur et al.
2017/0010463 A1  1/2017  Morizur et al.
(Continued)

FOREIGN PATENT DOCUMENTS

WO    2012/085046 A1    6/2012

OTHER PUBLICATIONS

Boucher et al., Continuous Axial Scanning of a Gaussian Beam via Beam Steering, Optics Express, vol. 25, No. 19, (Sep. 12, 20017), p. 23060.
(Continued)

*Primary Examiner* — Chris H Chu
(74) *Attorney, Agent, or Firm* — TraskBritt

(57) ABSTRACT

A device for multi-plane conversion of a first light radiation having a conversion block comprising a plurality of optical parts and implementing a plurality of phase masks to apply a spatiofrequential phase shift for producing a second light radiation—a predetermined transformation, known as a transformation with separable variables. The predetermined transformation may link N modes of index $\{i, j\}_k$, $1<=k<=N$, of a first used mode family with separable spatial variables (x,y) describing the first light radiation in a first transverse plane with n modes of the same index $\{i, j\}_k$ $1<=k<=N$, of a second used mode family with separable spatial variables (x,y) describing the second light radiation at a second transverse plane. The N modes of the second mode family are not Hermite-Gaussian modes. The N modes of the first mode family are not arranged on the first transverse plane in the form of a triangle.

10 Claims, 6 Drawing Sheets

(56) References Cited

U.S. PATENT DOCUMENTS

| | | | | |
|---|---|---|---|---|
| 2018/0052102 | A1* | 2/2018 | Yaman | G01H 9/004 |
| 2019/0097723 | A1* | 3/2019 | Morizur | H04B 10/2525 |
| 2020/0073054 | A1* | 3/2020 | Yang | G02B 6/29385 |
| 2020/0409141 | A1* | 12/2020 | Pinel | G02B 6/2848 |

OTHER PUBLICATIONS

Delaubert et al., Quantum Measurements of Spatial Conjugate Variables: Displacement and Tilt of a Gaussian Beam, Otpics Letters, vol. 31, Issue 10,. (2006), pp. 1537-1539 (abstract only), https://opg.optica.org/ol/abstract.cfm?uri=ol-31-10-1537.

Fontaine et al., Design of High Order Mode-Multiplexers Using Multiplane Light Conversion, 43rd Conference on Optical Communications, (ECOC, 2017), 3 pages.

International Search Report for International Application No. PCT/FR2019/050433 dated May 20, 2019, 2 pages.

International Written Opinion for International Application No. PCT/FR2019/050433 dated May 20, 2019, 9 pages.

Labroille et al., "Efficient and mode-selective spatial mode multiplexer based on multi-plane light conversion," Optics Express, Jun. 30, 2014, vol. 22, No. 13, p. 15599-15607.

Lengle, K., et al. "4x10 Gbit/s bidirectional transmission over 2 km of conventional graded-index OM1 multimode fiber using mode group division multiplexing," Optics express 24.25 (2016): 28594-28605.

Morizur et al., Programmable Unitary Spatial Modes Manipulation, J. Opt. Soc. Am. A/vol. 27, No. 11, (Nov. 2010), 20 pages.

Rawad et al., Highly Selective 7 Orbital Angular Momentum Mode Multiplexer Based on Multi-Plane Light Conversion, 2017 European Conference on Optical Communication (ECOC), IEEE, (Sep. 17, 2017), pp. 1-3.

* cited by examiner $$E(x,y) = k0\, E_{00}(x,y) + k_1\, E_{01}(x,y) \ldots + k_8\, E_{33}(x,y)$$

MULTI-PLANE CONVERSION DEVICE

CROSS-REFERENCE TO RELATED APPLICATIONS

This application is a divisional of U.S. patent application Ser. No. 16/975,673, now U.S. Pat. No. 11,828,935, issued Nov. 28, 2023, which is a national phase entry under 35 U.S.C. § 371 of International Patent Application PCT/FR2019/050433, filed Feb. 26, 2019, designating the United States of America and published as International Patent Publication WO 2019/162637 A1 on Aug. 29, 2019, which claims the benefit under Article 8 of the Patent Cooperation Treaty to French Patent Application Serial No. 18/51664, filed Feb. 26, 2018, the disclosure of each of which is hereby incorporated herein in its entirety by this reference.

TECHNICAL FIELD

The present disclosure relates to a method of designing a multi-plane conversion device. It also relates to a phase plate and a multi-plane conversion device obtained by this method.

BACKGROUND

Such optical devices are known from U.S. Pat. No. 9,250,454 and US2017010463, as are methods that allow the devices to be designed. The devices (often referred to by the acronym MPLC or Multi-Plane Light Conversion) allow any unitary spatial transformation of light radiation to be produced.

From a theoretical point of view, and as established in *"Programmable unitary spatial mode manipulation,"* Morizur et al, *J. Opt. Soc. Am. A/Vol.* 27, No. 11/November 2010, a unitary spatial transformation may effectively be decomposed into a succession of primary transformations, each primary transformation affecting the transverse phase profile of the light radiation.

The document "Design of High Order Mode-Multiplexers using Multiplane Light Conversion" by N. Fontaine et al, presented at the 43$^{rd}$ Conference on Optical Communications, (ECOC, 2017) recalls that the design of an MPLC device consists of determining the characteristics in a plane (x,y) of a set of phase masks, each mask i introducing a phase shift of $\phi_i$ (x,y). It also recalls in detail a method of designing these masks, which is based on an optimization algorithm by matching wavefronts. It refers to the alternative possibility of basing the design on a stochastic method of optimizing solutions produced by calculation.

This document also proposes a method for designing a spatial optical multiplexer that allows the number of phase masks required to implement the transformation that acts on the incident light radiation, to be limited. More specifically, this document discloses an MPLC device that converts an input made up of a linear 45-fiber bundle emitting Gaussian light radiation, into the first nine groups of modes of a multimode index-graded optical fiber. The conversion is carried out using 14 phase masks. The output modes of the device must be represented in a Hermite-Gaussian mode basis and, simultaneously, the input light beams must be rearranged in the transverse plane to arrange the beams in a triangle shape.

This document gives no explanation to help understand how the combination chosen (in particular, the choice of output basis and the rearrangement in a triangle of the input light beams) allows the conversion into 14 phase masks to be performed, except to state that the symmetry of the modes and the triangular arrangement could be the cause.

The present disclosure aims to establish a method for designing an optical MPLC device that is not limited to the very particular example presented in this document. It aims, in particular, to provide a design method that allows a transformation to be implemented using a relatively small number of phase masks, while giving great freedom of choice as to the nature of the mode bases and the arrangement of the beams.

BRIEF SUMMARY

In order to realize this aim, the object of the present disclosure proposes a method for designing a multi-plane conversion device of light radiation, the device implementing a plurality of phase masks intercepting the light radiation to apply, respectively, thereto a spatiofrequential phase shift leading to a predetermined transformation, the design method comprising the following steps:

defining a first mode family, each mode of the first family being designated by a pair of indices $\{i,j\}$ $1<=i<n$, $1<=j<=m$, the first family having separable spatial variables;

defining a second mode family, each mode of the second family being designated by a pair of indices $\{i,j\}$ $1<=i<n$, $1<=j<=m$, the second family having separable spatial variables;

forming a first and second used mode family, respectively, by selecting N modes of index pairs $\{i, j\}_k$ $1<=k<=N$, N being less than or equal to n*m and strictly greater than n and than m, in the first family and in the second family, respectively, the N modes of the second family not being Hermite-Gaussian modes and, simultaneously, the N modes of the first family not being arranged in a plane in a triangle shape;

establishing the spatiofrequential phase shift of the phase masks that allows each mode of index pairs $\{i,j\}_k$ of the first used mode family to be transformed into the mode of the same index pairs $\{i,j\}_k$ of the second used mode family.

By thus requiring that the first and second used mode families have the characteristic of separability of the spatial variables, and that each mode of index pairs $\{i,j\}_k$ of the first used mode family is transformed by phase masks into the mode with the same index pairs $\{i,j\}_k$ of the second used mode family, a predetermined transformation can be established by means of a small number of phase masks relative to a design method that does not impose these constraints.

According to other advantageous and non-limiting characteristics of the present disclosure, taken alone or in any technically feasible combination:

the first mode family and the second mode family are bases;

the bases of the first mode family and of the second mode family are orthonormal;

the spatiofrequential phase shift of the M phase masks is established by optimizing a degree of matching between the transformation of the modes of the first used mode family and the modes of the second used mode family;

the degree of matching is optimized by a stochastic optimization method;

the degree of matching is optimized by matching wavefronts;

the step aimed at establishing the spatiofrequential phase shift of the phase masks comprises:
  i. establishing a one-dimensional phase shift according to a first spatial variable and according to a second spatial variable, respectively;
  ii. combining the one-dimensional phase shifts according to the first spatial variable and according to the second spatial variable to establish the spatiofrequential phase shift of the phase masks;
the plurality of phase masks comprises additional phase masks that allow the modes of the first used mode family or of the second used mode family to be rearranged spatially.

The present disclosure also relates to a computer program comprising instructions suitable for implementing at least one of the steps of the design method, when the program is run on a computer.

It also relates to a phase plate manufactured from the spatiofrequential phase shift of at least one phase mask obtained at the end of the design method.

According to another aspect, the present disclosure proposes a multi-plane conversion device of a first light radiation, the device having a conversion block comprising a plurality of optical parts and implementing a plurality of phase masks supported by at least one of the optical parts, the phase masks applying a spatiofrequential phase shift aimed at producing a second radiation, the predetermined transformation, known as a transformation with separable variables, linking N index modes $\{i, j\}_k$, $1<=k<=N$, of a first used mode family with separable spatial variables describing the first light radiation at a first transverse plane with N modes of the same index $\{i, j\}_k$, $1<=k<=N$, of a second used mode family with separable spatial variables describing the second light radiation at a second transverse plane, the N modes of the second family not being Hermite-Gaussian modes and, simultaneously, the N modes of the first family not being arranged in the first transverse plane in the form of a triangle.

According to other advantageous and non-limiting characteristics of the present disclosure, taken alone or in any technically feasible combination:
  the multi-plane conversion device comprises at least one stage for injecting the first and/or the second radiation into the conversion block and/or extracting the first and/or the second radiation from the conversion block;
  the stage comprises a bundle of optical fibers arranged in a transverse stage plane, the first transverse plane being the transverse stage plane;
  the bundle of optical fibers for the stage is arranged in the transverse stage plane in the form of a rectangle or square;
  the stage comprises at least one multimode fiber;
  at least one of the optical parts supports at least one phase mask with separable spatial variables;
  the optical parts comprise two reflecting optical parts arranged facing one another, the phase masks being supported by one and/or the other of the two reflecting optical parts;
  the two optical parts are formed of a microstructured phase plate and a mirror, and the phase masks are supported by the microstructured phase plate;
  the multi-plane conversion device implements a plurality of transformations with separable variables.

BRIEF DESCRIPTION OF THE DRAWINGS

Other characteristics and advantages of the present disclosure will appear from the detailed description of example embodiments of the present disclosure that follows with reference to the accompanying drawings, wherein.

DETAILED DESCRIPTION

Figure 1:
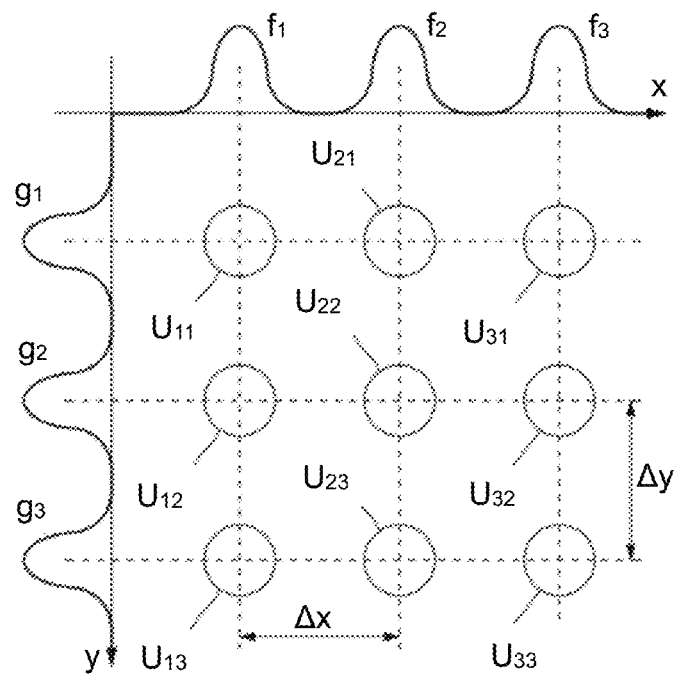
FIG. 1 shows by way of illustration a mode family with separable variables.

In the present disclosure, light radiation is defined as a family made up of at least one mode of the electromagnetic field, each mode forming a spatiofrequential distribution of amplitude, phase and polarization. Consequently, the modification or transformation of the light radiation refers to the modification or spatiofrequential transformation of at least one of the radiation modes.

In the present description, the radiation will be considered to be polarized in a single direction and to have a single frequency. However, the principles set out are entirely applicable to radiation having more than one polarization direction or more than a single frequency. Thus, the spatial phase shift applied to radiation by a phase mask in the context of the description may be expressed more generally as a spatiofrequential phase shift, in other words modifying the phase shift according to space variables in a transverse plane and according to the optical frequency.

In the interest of completeness, the operating principles of a multi-plane light conversion device, more commonly referred to as an MPLC (Multi-Plane Light Converter) are recalled. In this type of device, incident light radiation undergoes a succession of reflections and/or transmissions, each reflection and/or transmission being followed by propagation of the radiation in free space. At least some of the optical parts on which the reflections and/or transmissions act, and which guide the propagation of the incident radiation, have a microstructured surface that modifies the incident light radiation.

"Microstructured surface" means that the surface of the optical part may have "pixels" of which the dimensions are comprised between a few microns and a few hundred microns or more, for example. Each pixel has an elevation relative to a median plane defining the surface in question of, for example, at most a few microns or at most a few hundred microns or more. An optical part having this type of microstructured surface forms a phase mask introducing a local phase shift within the transverse section of the radiation, which is reflected or transmitted there.

Thus, light radiation, which is propagated within the component undergoes a succession of local phase shifts separated by propagations. The light radiation therefore undergoes a complex transformation. In other words, the succession of elementary transformations (for example, about ten successive transformations, or even fewer) establishes a global transformation of the spatial profile of the radiation. It is therefore possible to configure the microstructured surfaces to transform a first light radiation, which has, in particular, a specific shape, into a second radiation of which the shape is different.

In the present description, the shape of a light radiation will be considered to correspond to the spatiofrequential distribution of the amplitude and of the transverse phase of a mode or of a mode family composing the light radiation. In this regard, it is recalled that a mode at any point in space (x, y, z) may be expressed according to the mode of a single plane, in this case z=0, according to the Fresnel equation $$E(x, y, z) = \frac{e^{ikz}}{i\lambda z} \int\int_{-\infty}^{\infty} E(x', y', 0) e^{\frac{ik}{2z}[(x-x')^2+(y-y')^2]} dx' dy'$$

in the Fresnel approximation:

In other words, the description of the shape (i.e., the spatiofrequential distribution of the amplitude and of the phase of its modes) in a plane (x, y, z0) of a light radiation is sufficient to describe the radiation completely.

Having established these definitions, the design of an MPLC device aimed at transforming a first light radiation into a second light radiation comes down to establishing a configuration of phase masks for the device such that each mode $u_i(x,y)$ forming the first light radiation is transformed as closely as possible into a mode $v_j(x,y)$ of the second light radiation. This transformation may be perfect, theoretically, if a sufficient number of phase masks are provided and if the first and second mode families $u_i$ and $v_j$ form orthonormal bases.

If the mode families do not form orthonormal bases, it may sometimes also be possible to achieve a perfect transformation, or seek to approximate as closely as possible to the transformation. An MPLC conversion device is not limited to the transformation of orthonormal mode bases. In general, whether the spatial variables are separable or not, this type of device may also be designed from mode families that are not necessarily orthogonal.

The mathematical and physical demonstration of the existence of a configuration of phase masks for any unitary transformation has been described in the article by Jean-François Morizur cited in the introduction to the present disclosure. The feasibility of such a component has been demonstrated, as has its universal character, specifically the ability to produce any kind of unitary transformation of the shape of an incident light radiation.

A practical production of such a component has been proposed, for example, in the article by Guillaume Labroille et al, "Efficient and mode-selective spatial mode multiplexer based on multi-plane light conversion," in Optics Express, 30 Jun. 2014, vol. 22, No. 13, p. 15599-15607, which explains the structure of this component. More specifically, this component uses two mirrors arranged facing each other, at least one of the mirrors having a plurality of microstructured areas forming the phase masks. This architecture forms a multi-pas sage cavity in which radiation, which is reflected a number of times, is propagated, in particular, in the region of the different microstructured areas on both mirrors.

The design of the phase masks (i.e., the microstructured areas) of an MPLC device is performed in practice by simulation in a computer capable of modeling the behavior of the light radiation during its propagation guided by the different optical parts, and, in particular, those having the microstructured areas forming the phase masks. The computer simulates the propagation in the succession of optical elements of an incident light radiation having an input shape and calculates the resulting transformed radiation. This simulation may be based, in particular, on the Fresnel propagation equation that has just been presented.

Generally, to design the MPLC device, a number of phase masks is established and a search is made to determine each phase mask that leads to the transformed radiation composed of modes, $u_i^t$, in other words the $u_i$ modes of the incident radiation (the first light radiation) transformed by the device, being made to coincide with a desired radiation. This desired radiation (the second light radiation) is composed of all the modes of the second family $v_j$, sometimes referred to as the output family.

The degree of matching between these two radiations a may be expressed, for example, as a numeric value $\alpha=\Sigma_i|\iint u_i(x,y)v^*_j(x,y)dxdy|^2$ which is therefore to be maximized in the course of the design method.

This search may take the form of an optimization problem aimed at determining for each phase mask the phase shift $\phi_1$, $(x_k,y_k)$ of each pixel positioned at a point $(x_k,y_k)$ of the microstructured area forming the mask. For example, if the optical device comprises more than 10 phase masks and the pixel resolution of the masks is great, this optimization step seeks to determine a very large number of parameters, which may exceed a million.

Document WO 2012/085046 presented in the introduction to the present disclosure proposes design methods aimed at simplifying this particularly complex optimization problem by matching wavefronts in the region of each phase mask. These methods, which are also recalled by the article by N. Fontaine, allow the optimization problem to be simplified and converge asymptotically toward a solution. To improve the quality of the transformation obtained, a typical approach consists of increasing the number of phase masks used and repeating the design steps. However, a large number of phase masks makes the manufacture of the MPLC device particularly complex.

The present disclosure takes a completely different approach. It imposes characteristics on the first and second mode families $u_i$, vj, which the transformation links. These constraints lead to a new optimization problem for which the solutions form a class of transformations that is particularly simple to implement, i.e., that only requires a small number of phase masks, which are also easy to manufacture.

More specifically, the present disclosure is based on choosing first and second mode families that allow the decomposition of the incident radiation and of the desired radiation, respectively so that these families have separable spatial variables.

It is recalled that a field with separable variables is a field of which the transverse profile in a plane z=0 is written in the form $E(x, y, 0) = f_0(x) \cdot g_0(y)$, where $f_0$ and $g_0$ are named "generating functions." It is possible to show that if this radiation is propagated under the Fresnel approximation, it remains separable in any plane z. The Fresnel integral may be factorized in the form:

$$E(x, y, z) = \frac{e^{ikz}}{i\lambda z} \int\int_{-\infty}^{\infty} E(x', y', 0) e^{\frac{ik}{2z}[(x-x')^2+(y-y')^2]} dx' dy'$$

$$E(x, y, z) = \frac{e^{ikz}}{i\lambda z} \left( \int f(x') e^{\frac{ik}{2z}(x-x')^2} dx' \right) \left( \int g(y') e^{\frac{ik}{2z}(y-y')^2} dy' \right)$$

in other words $E(x, y, z)=f_z(x) \cdot g_z(y)$, which does indeed prove that it has separable spatial variables in any plane z. It should be noted that the functions $f_z(x)$ and $g_z(y)$ are, respectively, and uniquely dependent on $f_0(x)$ and $g_0(y)$. In other words, in any plane z, $f_z(x)$ is only determined by $f_0(x)$. The same applies for $g_z(y)$.

The influence of a spatial phase $\phi(x,y)$, for example, during reflection or transmission on a phase mask, is on the product of the field by an exponential term $e^{i\phi(x,y)}$. The phase shift introduced by a phase mask with separable spatial variables is naturally defined as a phase sum $\phi(x,y)=\psi(x)+\theta(y)$.

Thus, a radiation $E(x,y)$ with separable variables undergoing the phase shift $\phi(x,y)$ is expressed as:

$$E(x,y)e^{i\phi(x,y)}=(f(x)e^{i\psi(x)})(g(y)e^{i\theta(y)})$$

and it too still has separable spatial variables. The phase according to x only has influence on the component according to x of this radiation, and the same applies for the phase according to y. In other words, under the effect of the phase masks with separable variables, the two components according to x or y of the radiation remain independent of one another and are "with separable variables." A mode with separable spatial variables therefore remains separable after propagation in free space and under the influence of a phase mask with separable spatial variables.

In the context of the present disclosure, a mode family with separable spatial variables (or more concisely "with separable variables") is therefore defined in a plane provided with a system of Cartesian coordinates (x,y), a family u composed of $u_{ij}$ modes of indices $\{i,j\}$, $1<=i<=n$ and $1<=j<=m$, such that for any i and for any j it is possible to express:

$$u_{ij}(x,y)=f_i(x) \cdot g_j(y)$$

It is specified that this characteristic of separability of the spatial variables does indeed concern the mode family in its entirety and that it is not sufficient to be able to separate the spatial variables of each of the modes of a family for this characteristic to be effectively present for the family in question.

Of course, in reality it is not always possible to verify very precisely the equalities defining a field or a mask with separable variables. In addition, deviations in respect of these equalities may therefore be tolerated, and it may still be considered that this is indeed a family or a phase mask with separable spatial variables.

The present disclosure makes use of these observations to provide a method of designing a multi-plane conversion device of light radiation. It proposes, in particular, to define a first and second mode family, both with separable variables, and to establish the phase masks that allow each mode of the first family to be transformed into a corresponding mode of the second family (in other words with the same index $\{i, j\}$).

It will be noted that this principle is very far removed from the symmetry hypotheses of the modes and arrangement in a triangle presented by the document of the prior art by N. Fontaine. These hypotheses are based on the results of a very particular design method in which simultaneously the output modes are chosen to be Hermite-Gaussian modes and the input modes are rearranged in the transverse plane to be arranged in the form of a triangle. Thus, in the absence of detailed explanations justifying the performance of the MPLC designed, this document cannot provide any teaching that would allow this experiment to be generalized beyond the configuration chosen.

In addition, in no case is this a question of positioning the modes of the first family in an arrangement of the plane that takes up the arrangement of the maximum intensity lobes of the second mode family, as could also have been suggested. Moreover, the modes forming the families do not need to have any axis of symmetry for a family to be a family with separable variables.

A design method according to the present disclosure functions, in particular, with any second mode family with separable variables that is not Hermite-Gaussian. It also functions for any arrangement of the input modes that is not triangular.

Figure 2:
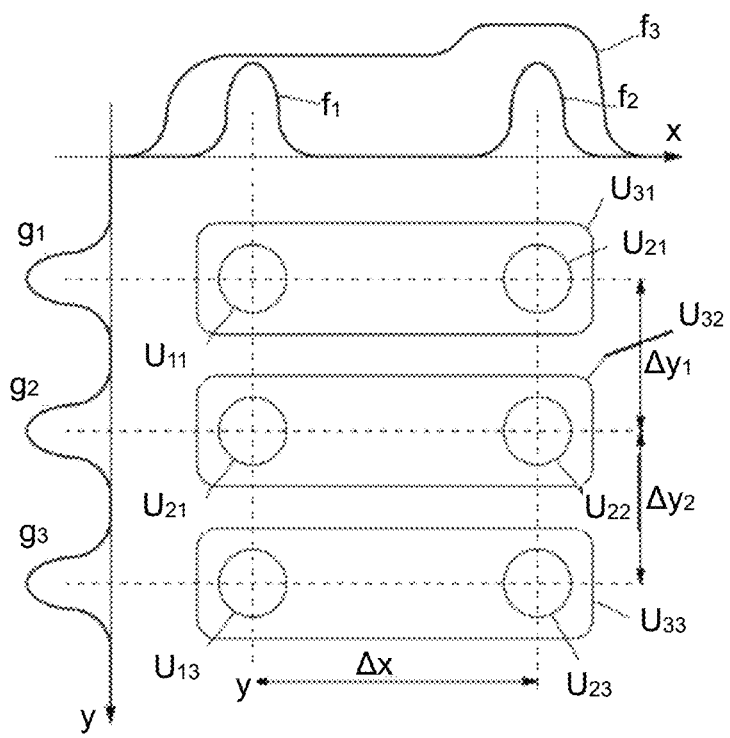
FIG. 2 is a second illustration of a mode family with separable variables.

To illustrate the basic differences between the principle of the present disclosure and a simple effect of symmetry proposed by the document by N. Fontaine, FIGS. 1 and 2 show a number of examples of mode families with separable variables. To simplify the figures, a limited number of modes has been shown, but of course the entire significance of the present disclosure is that the number of modes dealt with by the MPLC device is large, more than 10, 20, or even 50 or 100 modes.

Thus, in FIG. 1 a mode family $u_{ij}(x,y)$ has been shown in a plane provided with a system of Cartesian coordinates (x,y). This mode family has separable variables as all the modes $u_{ij}(x,y)$ may be expressed as the product $u_{ij}(x,y)$, $f_i(x) \cdot g_i(y)$ for any pair (x,y) in the plane. The generating functions are expressed in this case in the form of Gaussians centered on the points of the plane (i·Δx, j·Δy) where the pitches Δx and Δy are chosen as constant. Another arrangement may be envisaged that does not fix the pitches Δx, Δy as constant while retaining the separable character of the family.

FIG. 2 shows, also by way of illustration, a second example of a mode family with separable variables. In FIG. 2, it can be seen that the modes $u_{ij}$ are not arranged uniformly on a regular grid of the plane (x,y). The generating functions $g_1$, $g_2$, $g_3$ are centered on points that are separated, respectively, by a pitch Δy1, Δy2, which pitches are different from one another. It may also be noted that the generating functions $f_1$, $f_2$, $f_3$ are of completely different natures. The generating functions do not need to have any symmetry.

In practice, to design an MPLC device, any suitable mode family with separable variables may be chosen. However, some families are particularly useful. These are, in particular:

the family composed of modes having generating functions ($f_i$, $g_i$) that are Gaussians, as shown in FIG. 1 and as obtained at the output of a bundle of optical fibers;
the family of Hermite-Gaussian modes, which form a mode basis of a parabolic index-graded optical fiber;
the family of elliptical Hermite-Gaussian modes.

Figure 3:
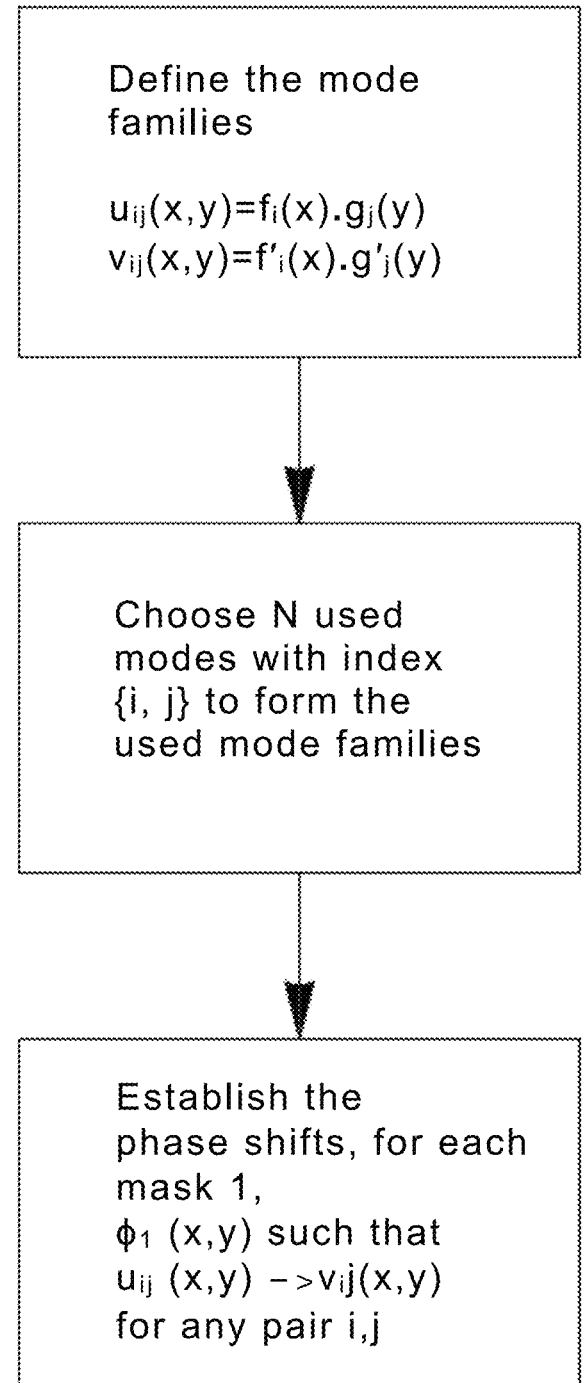
FIG. 3 shows the steps of a method according to the present disclosure.

These general principles being established, the present disclosure proposes a method for designing an MPLC multi-plane conversion device implementing a plurality of phase masks M to apply a predetermined transformation. FIG. 3 shows the steps of the method schematically.

The design method therefore aims to determine digitally the phase masks M that allow the transformation to be produced. As already seen, the masks are defined by a plurality of pixels k arranged at positions $(x_k, y_k)$ of a plane. However, in the interest of simplifying the description that follows, the phase shift imposed in the plane by the mask l ($1<=l<=M$) will be expressed as a function $\phi_l(x,y)$, by masking its discrete character.

A step of the method according to the present disclosure aims to define a first mode family u, each mode ($u_{ij}$) of the first family being designated by an index pair $\{i,j\}$ $1<=i<=n$, $1<=j<=m$. This first family has separable variables such that $u_{ij}(x,y)=f_i(x) \cdot g_i(y)$ may be expressed. A number n of generating functions $f_i$ and a number m of generating functions $g_j$ are thus defined.

Another step of the method according to the present disclosure aims to define a second mode family v, each mode of the second family $(v_{ij})$ being designated by an index pair $\{i,j\}$, $1<=i<=n$, $1<=j<=m$. This second family also has separable variables such that $v_{ij}(x,y)=f'_i(x) \cdot g'_j(y)$ may be expressed. A number n of generating functions $f'_i$ and a number m of generating functions $g'_j$ are thus defined.

It will be noted that the indices ij designating each of the modes of the first and second mode family are not allocated arbitrarily to the modes, but result directly from the indices i and j of the generating functions that produce them.

These first steps of the design method therefore allow the mode families with separable variables to be defined, which will be transformed, one to the other by the MPLC device. These two families have the same cardinality n.m. However, not all the modes $\{i,j\}$, $1<=i<=n$, $1<=j<=m$ forming these families actually need to be used by the device.

Thus, in the illustrative example in FIG. 1, of the nine modes of the family shown, it is possible to choose to use only some in the MPLC device. It is possible, for example, to choose not to use modes $u_{11}$ and $u_{33}$. In this case, modes of the second family must also be eliminated to preserve the same cardinality for the families. To also preserve the property of separability of the variables during propagation, of the reflection and/or transmission of the radiation, it is important that each mode of the first family of index $\{i,j\}$ is transformed into the mode of the second family with the same index $\{i,j\}$. This therefore leads to the elimination of the modes $v_{11}$ and $v_{33}$ from the second mode family in the example used as an illustration.

More generally, a design method according to the present disclosure comprises a step aimed at choosing a number N, which is less than or equal to n*m and strictly greater than n and than m, of index pairs $\{i,j\}_k$, 1k, $1<=k<=N$ and to form a first and second used mode family, respectively, by selecting the modes of index pairs i,j 1k, $1<=k<=N$ in the first and second family, respectively.

It will be noted that the character of separability of the spatial variables is preserved in the first and second used mode families.

To use all the potential of the design method, the number N of used modes is chosen so as to be strictly greater than n and than m. In other words, the number of used modes does not simply consist of choosing a row, column or diagonal from the mode family, if they are arranged as shown in FIG. 1, for example.

As has been seen, the mode families may advantageously form an orthonormal basis, but this characteristic is not a necessary limitation of the present disclosure.

According to the present disclosure, the transformation sought links each mode of index pairs $\{i,j\}_k$ of the first used mode family in the same mode of index pairs $\{i,j\}_k$ of the second used mode family. Thus, each mode of index pairs $\{i,j\}_k$ of the first used mode family is matched after propagation in the MPLC device with the same mode of index pairs $\{i,j\}_k$ of the second used mode family. The "separable" character of the quantities $\phi_1(x,y)$ defining the phase masks is thus preserved.

If the N modes of the second used mode family are all Hermite-Gaussian modes and, simultaneously, the modes $\{i,j\}_k$ chosen from the first family are arranged in a triangular plane, the solution proposed in the article of the prior art by N. Fontaine is fortuitously rediscovered.

Once these constraints on the mode families and their associations have been imposed, an optimization step may be deployed in a subsequent step of a method according to the present disclosure, aimed at establishing the phase shift quantities $\phi_1(x,y)$, $1<=l<=M$, of the M phase masks that allow the first used mode family to be transformed as closely as possible into the second used mode family.

The optimization step as such is not necessarily different from those of the prior art. It aims therefore to establish phase shift quantities $\phi_1(x,y)$, $1<=l<=M$, of the M phase masks maximizing a level of correspondence a between the transformation of the modes of the first used mode family and the modes of the second used mode family.

The present disclosure is not limited to a particular optimization method. It may therefore be a stochastic optimization method or an optimization method by wavefront convergence as described in the documents of the prior art.

At the end of the optimization step, a digital model $\phi_1(x,y)$ of each of the M phase masks is therefore available, allowing a predetermined transformation to be applied to an incident radiation. More precisely, the model consists of phase values $\phi_1(x_k,y_k)$ in every pixel $(x_k,y_k)$ of the plane of each of the M phase masks. The phase shifts may easily be transformed into an elevation for each pixel, which will allow the phase masks to be manufactured. If the optimization is carried out correctly, each of the M phase masks has the property of having separable variables or is close to having this property.

The first and second used mode families do not need to form the input and output families of the MPLC device. Generally, it can be said that the predetermined transformation links the N modes of the first used mode family describing the first light radiation at a first transverse plane in the device with the N modes of the same index of the second used mode family describing the desired light radiation at a second transverse plane of the device, respectively. The M phase masks allow the transformation to take place between the first and the second transverse planes.

Some additional phase masks may be provided arranged upstream and/or downstream of the M phase masks required to transform inputs to the first mode family at the first transverse plane or the second mode family at the second transverse plane to outputs. More generally, the additional phase masks allow the modes of the first used mode family or of the second used mode family to be rearranged spatially.

In a first approach, the additional masks are added directly to the digital model of the MPLC device in the course of the design method, which has just been described. In the method, the object is to determine the characteristics of all the phase masks, including the additional masks. In the optimization step an object may be to ensure that the used mode families at the first transverse plane and at the second transverse plane do indeed correspond to the first and second family, respectively, and therefore have separable variables.

In another approach, the additional masks are determined in the course of a second iteration of the optimization step in which the masks are added to the digital model of the MPLC device provided with M phase masks established at the end of the first iteration.

On this matter, it should be noted that a design method according to the present disclosure may provide a plurality of iterations of the optimization step. The successive iterations may seek to adjust the phase masks obtained at the end of a previous iteration by the design method described. It may be a question of adding additional phase masks, as has been seen, or of making the masks more manufacturable, for example, by imposing constraints on the phase shift spatial variations of a mask. The adjustment of the phase masks that is applied by the successive iterations may ultimately lead to the masks (or some of them) no longer verifying the separability relation of the spatial variables.

However, in some cases it may be possible to recover a mask or a plurality of masks by imposing a phase shift $\phi_1(x,y)$ with separable variables, in other words $\phi_1(x,y)$ satisfies the relation $\phi_1(x,y)=\psi_1(x)+\theta_1(y)$.

According to a particularly advantageous variant of the present disclosure, the optimization step aimed at producing the quantities $\phi_1(x,y)$, $1<=l<=M$, of the M masks may benefit directly from their "separable" character.

Using the same notations for the [first] mode family $u_{ij}(x,y)=f_i(x) \cdot g_i(y)$ and the second mode family $v_{ij}(x,y)=f'_i(x) \cdot g'_j(y)$, the digital model of the MPLC device can be simplified in order to reduce it to a single-dimension optimization problem. In this case, M phase masks are sought with indices 1, $\psi_1(x)$, such that the generating functions $f_i(x)$ for i=1 to n are transformed into the generating functions $f'_i(x)$, respectively. Simultaneously, the M one-dimensional masks of phase and of index 1 $\psi_1(y)$ are determined such that the generating functions $g_j(y)$ for j=1 to m are transformed, respectively, into the generating functions $g'_j(y)$. In other words, a one-dimensional phase shift is established according to a first spatial variable, for example, of abscissa x, and according to a second spatial variable, for example, of ordinate y, respectively.

It is then possible to combine the one-dimensional phase shifts according to the first spatial variable (x) and according to the second spatial variable (y) to establish the spatiofrequential phase shift of the phase masks. More precisely, the phase masks $\phi_1(x,y)$ $1<=l<=M$ are determined by means of the expression $\phi_1(x,y)=\psi_1(x)+\theta_1(y)$. The algorithmic complexity of the optimization is reduced by this approach, and the power and calculation time required to perform the optimization are greatly reduced.

Generally, a design method according to the present disclosure is advantageous in that it is possible to work directly or indirectly during optimization on the n+m relations between the generating function fi, fi', gi, gi' rather than on the relations between the n·m modes. Since the complexity is reduced from an order n·m to an order max(n,m), the very particular advantage of this approach will be understood.

Whatever optimization method is chosen to establish the digital model $\phi_1(x,y)$ of the M phase masks, the digital model may be used to manufacture by any suitable technique (for example, by machining, molding and/or photolithography and engraving a rough optical part) and aims to microstructure one or more of the reflection/transmission surfaces of an optical part, to make a phase plate therefrom. In other words, at least one phase mask $\phi_1(x,y)$ obtained at the end of the design method according to the present disclosure may be used to manufacture a phase plate. If the optical part, such as a phase plate, is microstructured according to a motif resulting from the implementation of a method according to the present disclosure, the microstructured surface is not in the form of a triangle.

The model may also be implemented by other means, for example, by "programming" the spatial phase shift imparted by a deformable mirror or a spatial light modulator (SLM).

Figure 4:
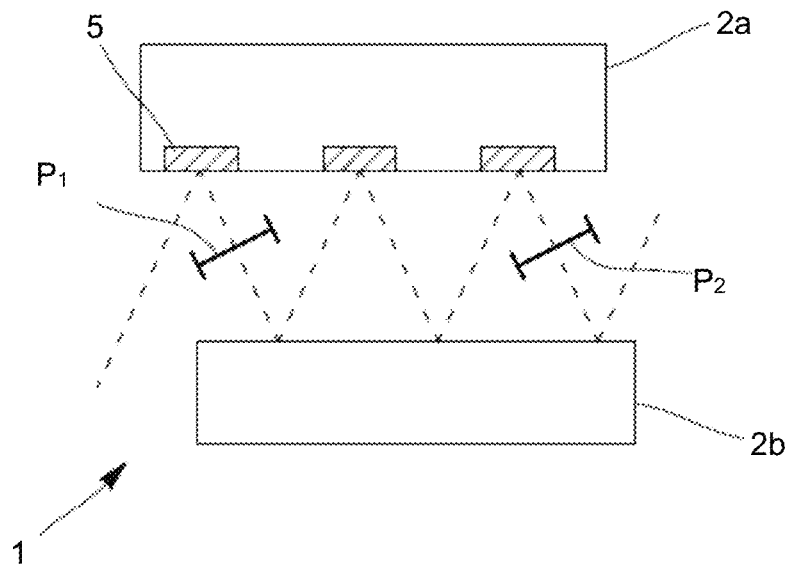
FIG. 4 shows a first example of a multi-plane conversion device according to the present disclosure.

With reference to FIG. 4, an MPLC device 1 designed and manufactured from a design method according to the present disclosure has a conversion block 2 comprising a plurality of optical parts 2a, 2b implementing a plurality of phase masks 5 supported by at least one of the optical parts 2a, 2b, the phase masks (5) applying a spatial phase shift $\phi_1(x,y)$ aimed at producing a second radiation. The surfaces of the optical parts supporting the phase masks have a Cartesian coordinate, which allows pixels and the phase shifts associated therewith to be located in positions $(x_k, y_k)$, respectively.

Thus, in the example in FIG. 4, the architecture of the conversion block 2 has been chosen such that it comprises two reflecting optical parts 2a, 2b positioned facing one another, the phase masks 5 being supported by one and/or the other of the two reflecting optical parts to form a multi-passage cavity. Here, the phase masks 5 are all supported by a phase plate 2a that has microstructured areas 5 forming the masks, the second optical part 2b being a simple mirror.

In the MPLC device 1 according to the present description, there is a first plane P1 transverse to the light radiation in which the radiation may be described by the first mode family with separable variables (x,y). There is also a second transverse plane P2 in which the radiation may be described by a second mode family with separable variables (x,y). Of course, the first and second mode families are not strictly, in other words mode-by-mode, identical.

As has been seen, the phase shifts $\phi_1(x,y)$ of the M phase masks were established such that the predetermined transformation would link N modes with indices $\{i, j\}_k$, $1<=k<=N$ of the first family with N modes with the same index $\{i, j\}_k$, $1<=k<=N$ of the second family. The modes of the second family are not Hermite-Gaussian modes and, at the same time, the modes of the first family are not arranged in the first transverse plane in the form of a triangle.

In a particular design case of such a device 1, at least one of the optical parts of the conversion block 2 may have a phase mask with separable variables. The part may be a phase plate, a deformable mirror or a spatial light modulator.

Figure 5A:
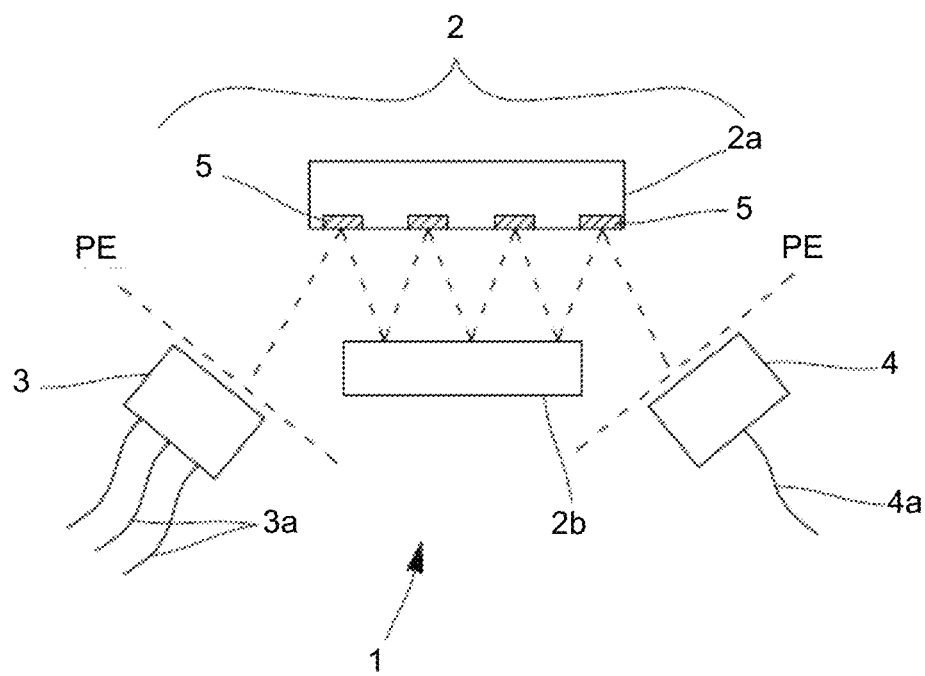
FIGS. 5a and 5b show another example of a multi-plane conversion device according to the present disclosure.

Another example of an MPLC device according to the present disclosure is shown in FIG. 5a. The conversion block 2, comprising the multi-passage cavity as described in the previous example, is also seen here. At least one stage has also been provided to inject the first or second radiation into the conversion block 2 and/or to extract the first and/or second radiation from the conversion block 2.

In this new example, the MPLC device comprises more specifically a first stage 3, in particular, to inject incident light radiation into the conversion block 2 and a second stage 4, in particular, to extract the transformed radiation from the conversion block 2.

However, it will be noted that in general the stages 3, 4 could have the opposite function to that described here, or the same stage 3, 4 could both inject and extract incident and transformed radiation from the conversion block 2. The first stage 3 may comprise an optical fiber or a bundle of optical fibers 3a arranged linearly or not in a first transverse stage plane. Similarly, the output stage may comprise a multimode fiber 4a or a bundle of optical fibers arranged freely in a second transverse stage plane. There may also be fewer than two stages or more than two stages.

In the advantageous configuration shown in FIG. 5a, the first stage 3 consists of a bundle of optical fibers 3a arranged in a first transverse stage plane PE. The first transverse stage plane forms the first transverse plane of the MPLC device, in other words in the transverse stage plane PE, the incident radiation is expressed as a mode family with separable spatial variables, i.e., the first mode family.

Figure 5B:
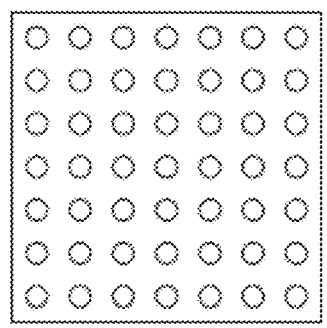

Thus, the optical fibers 3a of the bundle may be arranged in the form of a regular rectangular or square matrix as shown on the transverse stage plane in FIG. 5b such that the spatial variables of the first mode family may be separable in a system of Cartesian coordinates in the plane PE.

The first stage 3 may combine 81 monomode optical fibers 3a into a bundle arranged and assembled in a square made up of nine columns and nine rows. The free ends of the optical fibers 3a are provided with a collimating optic, as is well known per se, in order to shape the light radiation coming from each fiber into Gaussian form. The incident light radiation, which is provided by the stage 3 does indeed constitute a mode family with separable variables. Each mode is formed of the Gaussian radiation extracted from one of the optical fibers of the bundle, which may be designated by an index pair {i, j} where i and j designate, respectively, the row and the column of the fiber in question in the bundle.

The second stage 4 in the example shown in FIG. 5a comprises a multimode fiber 4a of which the guided modes are Hermite-Gaussian modes. The modes, as has been seen, form a mode family with separable spatial variables when designated by their usual index pairs {i, j}. The second transverse stage plane defined by the second stage 4 constitutes the second transverse plane of the MPLC device 1 in which the desired radiation is expressed by the second mode family with separable spatial variables.

The multi-plane device 1 in this example aims to transform the radiation coming from the 81 optical fibers 3a of the first stage 3 to couple the fibers to the multimode fiber 4a of the second stage 4 and form a spatial multiplexer. It will be noted that the device 1 may absolutely be used in an opposite direction, and spatially demultiplex incident radiation coming from the multimode fiber 4a and couple the modes of the fiber to the optical fibers 3a of the first stage 3.

In this particular example (shown in a simplified way in FIG. 5a), the phase plate 2a has 11 phase masks 5 designed using a method according to the present disclosure. In other words, a digital model of the device 1, which has just been presented is used by simulation to determine the characteristics of the 11 phase masks 5 supported by the phase plate 2a in order to adjust the transformation of each index mode {i, j} of the first stage 3 optimally to the corresponding mode with the same index {i, j} of the family of Hermite-Gaussian modes of the second stage.

To achieve greater precision, one or more additional phase masks 5 may be provided in the conversion block 2 allowing radiation to be formed on the first transverse plane P1 of the device 1, which as far as possible has separable variables.

Alternatively, the implementation imprecision may be tolerated, in other words the phase masks 5 may be designed from a design method according to the present disclosure for which, in the first stage plane Pe, the incident light radiation is described based on the first mode family with perfectly separable variables. The MPLC device will be produced from digital models of the phase masks 5 obtained at the end of the design method, and from a first stage in which the arrangement of the optical fibers in the stage plane is only approximated by a mode family with separable variables.

First Application Example

It is sometimes important to perfectly control the shape of a monomode laser beam (i.e., the spatial distribution of the amplitude and the phase in a transverse plane of its radiation). This is the case, in particular, if the beam is used to machine a part with very great precision, and it may be desired in this case to use a "top-hat" shaped beam, for example. However, it is not always possible to position the beam in space mechanically with the very great precision.

The manufacturing tolerances of the elements forming the machining equipment, drift errors and parasitic movements (vibrations) to which the equipment may be subject may introduce shifts in the position occupied by the source laser, and more generally in the position, size, orientation and/or ellipticity of the beam supplied by the source and therefore affect the shape of the beam that attacks the part to be machined.

Figure 7:
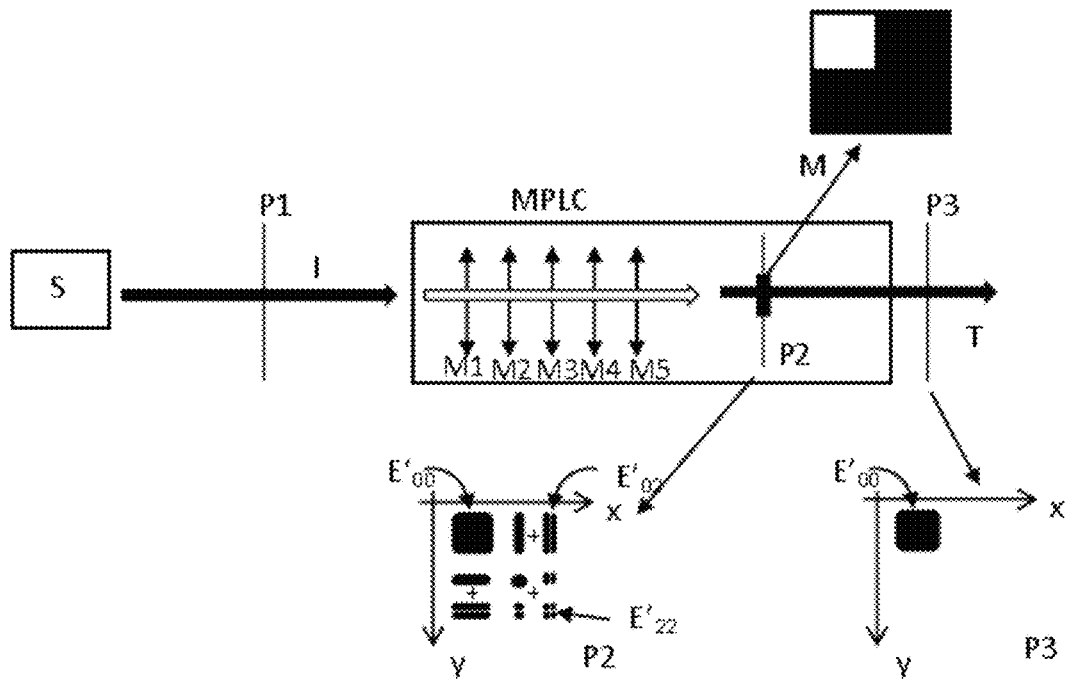
FIG. 7 shows a modal filtering device.

It is therefore proposed to design an MPLC device using a method according to the present description that allows this problem, at least partly, to be solved. As shown in FIG. 7, a source of light radiation S is arranged upstream of the MPLC conversion device. The source S emits incident radiation I, which is transformed by the device into transformed radiation T. The MPLC conversion device in this case comprises five phase plates M1 to M5 configured so that only a main mode of the incident radiation is completely propagated to form the transformed radiation, the other modes forming the incident radiation I being absorbed by the conversion device, or dissipated in any suitable way without contributing to forming the transformed radiation T.

Figure 6:
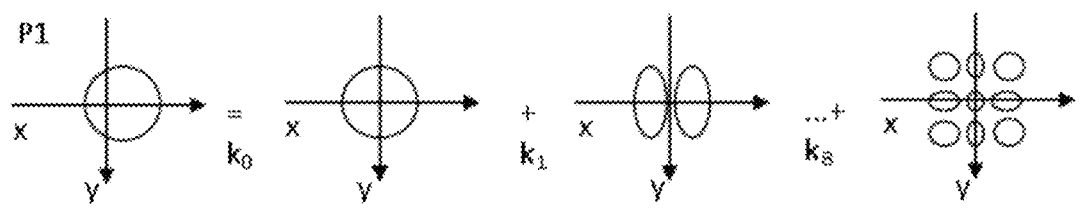
FIG. 6 shows an example of modal decomposition of an incident radiation.

In this example, it is considered that the source is supposed to emit incident light radiation of Gaussian form, centered at point (0, 0) of a Cartesian coordinate of a first plane P1 transverse to the incident radiation I. As has been stated, the exact position, size, orientation and/or ellipticity of the incident beam in the first plane may be imperfect or may vary over time relative to its expected position, size, orientation or ellipticity. As an example, the expected position is centered on the coordinate of the plane. Whatever the exact shape of the radiation at a given point in time, and as shown in FIG. 6, the shape E(x,y) of the beam in the first plane P1 may be modally decomposed, for modest variations in amplitude, as a combination of Hermite-Gaussian modes. On this subject, reference may be made to the article "Quantum measurements of spatial conjugate variables: displacement and tilt of a Gaussian beam," V. Delaubert, Optics Letters, Vol. 31, Issue 10, pp. 1537-1539, (2006).

In the context of this example, the first nine Hermite-Gaussian modes, $E_{00}$ to $E_{22}$, are therefore chosen, the first mode family with separable variables. All are superimposed spatially.

A second mode family is also defined in a second transverse plane P2 positioned downstream of the conversion and also provided with the same Cartesian coordinate (x,y). This second family is made up of a main "top-hat" mode $E'_{00}(x,y)$ and eight perturbation modes $E'_{01}(x,y)$ to $E'_{22}(x,y)$. The eight perturbation modes do not cover the main mode in the second plane P2. They do indeed form a family with separable variables, as shown in FIG. 7.

To solve the problem posed, the MPLC is configured such that the modal transformation of the incident radiation leads to the transformation of each mode $E_{ij}(x,y)$ of the first plane into the mode $E'_{ij}(x,y)$ of the second plane, in other words, each mode of the first family is transformed into the mode with the same index of the second family. Thus, whatever the exact position of the incident light beam relative to the MPLC, the portion of the incident radiation that corresponds to the first Gaussian mode $E_{00}(x,y)$ is transformed into the "top-hat" mode $E'_{00}(x,y)$. The other portions of the incident radiation, being projected into the other modes of the first family, are transformed into the other modes of the second family. A mask M can therefore be placed at the output of the MPLC device, after the transformation performed by the phase masks, aimed at blocking the propagation of this portion of the transformed radiation, such that only the portion corresponding to the first mode $E'_{00}(x,y)$ is propagated, as can clearly be seen in FIG. 7, in the transverse representation of a third plane P3 downstream of the mask M.

The method according to the present disclosure allows a limited number of phase masks to be provided for the MPLC device in order to implement the modal transformation that has just been described. It is possible, for example, to configure the MPLC so that it comprises five phase masks $\phi_i(x,y)$ (i.e., five reflections or transmissions of the incident light radiation imposing a spatial phase shift of the radiation). In addition, the profiles of each of the masks $\phi_i(x,y)$ are sought digitally, leading to the precise transformation of the first mode family into the mode with the same index pair of the second mode family. As has been seen, this search may be posed as a digital optimization problem, and the separability of the variables of the first and second mode families allows this problem to be converged effectively toward a solution that has a good level of optimality, even if the number of masks is small, five in the example used.

Second Application Example

Situations exist where it would be desirable to transform a separable basis into another separable basis without the a priori existence of a correspondence of indices $\{i,j\}_k$. This is the case, in particular, for mode multiplexing/demultiplexing applications, an illustration of which will be found in the document by Lenglé, K., et al. "4×10 Gbit/s bidirectional transmission over 2 km of conventional graded-index OM1 multimode fiber using mode group division multiplexing," *Optics express* 24.25 (2016): 28594-28605. As has been seen, some additional phase masks may be provided positioned upstream and/or downstream of the M phase masks needed for the transformation "with separable variables."

Figure 8:
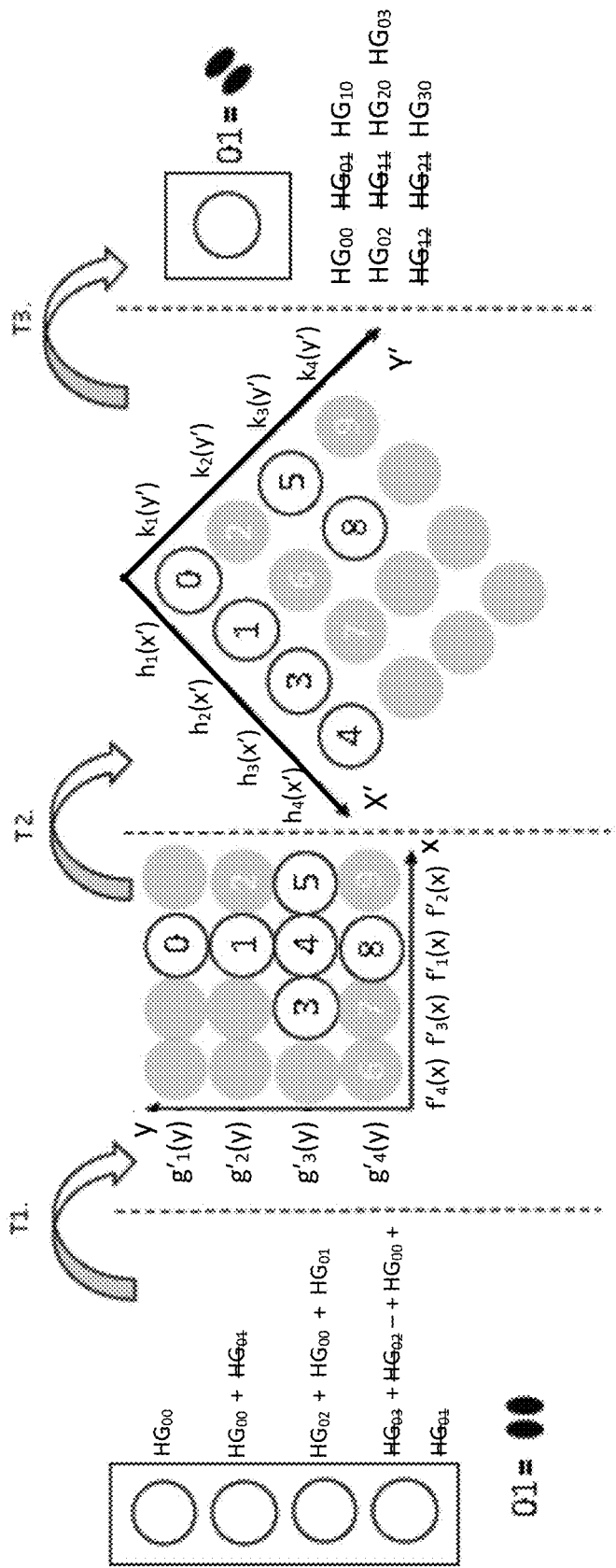
FIG. 8 shows a second application example of a design method according to the present disclosure.

In FIG. 8 a process diagram has therefore been shown illustrating the design of an MPLC device transforming the incident light radiation coming from a bundle of four optical fibers, forming an input stage of the converter, into transformed light radiation injected into a single multimode fiber, forming an output stage of the converter.

The first fiber of the bundle is a monomode fiber and propagates a first useful Gaussian light radiation $HG_{00}$, which has the reference numeral 0 in FIG. 8. The second fiber of the bundle is a fiber having two modes, a Gaussian mode $HG_{00}$ (reference numeral 1 in FIG. 8) and a Hermite-Gaussian mode $HG_{01}$ of rank 01 (reference numeral 2 in FIG. 8). Only the Gaussian radiation $HG_{00}$ guided by the fiber is a useful radiation. The third fiber guides a Gaussian radiation $HG_{00}$ (reference numeral 4), two Hermite-Gaussian modes $HG_{02}$, $HG_{01}$ of respective ranks 02 and 01 (and reference numerals 3 and 5), all three being useful. Finally, a fourth fiber guides a Gaussian radiation $HG_{00}$ (reference numeral 8) and three Hermite-Gaussian modes $HG_{01}$, $HG_{02}$, $HG_{03}$ of respective ranks 01, 02 and 03 (and reference numerals 6, 7 and 9 in FIG. 8). Only the Gaussian radiation is useful.

The multimode fiber forming the output stage is suitable for guiding 10 Hermite-Gaussian modes, six of these modes being intended to receive the useful modes of the input stage. The modes of the output stage are also rotated by 45° relative to those of the input stage.

There is no single transformation with separable variables that allows the useful modes of the input stage to be transformed into the chosen modes of the output stage.

To solve this problem, a multi-plane conversion device is designed to successively perform three conversions T1, T2, T3, using three series of phase plates.

Figure 9:
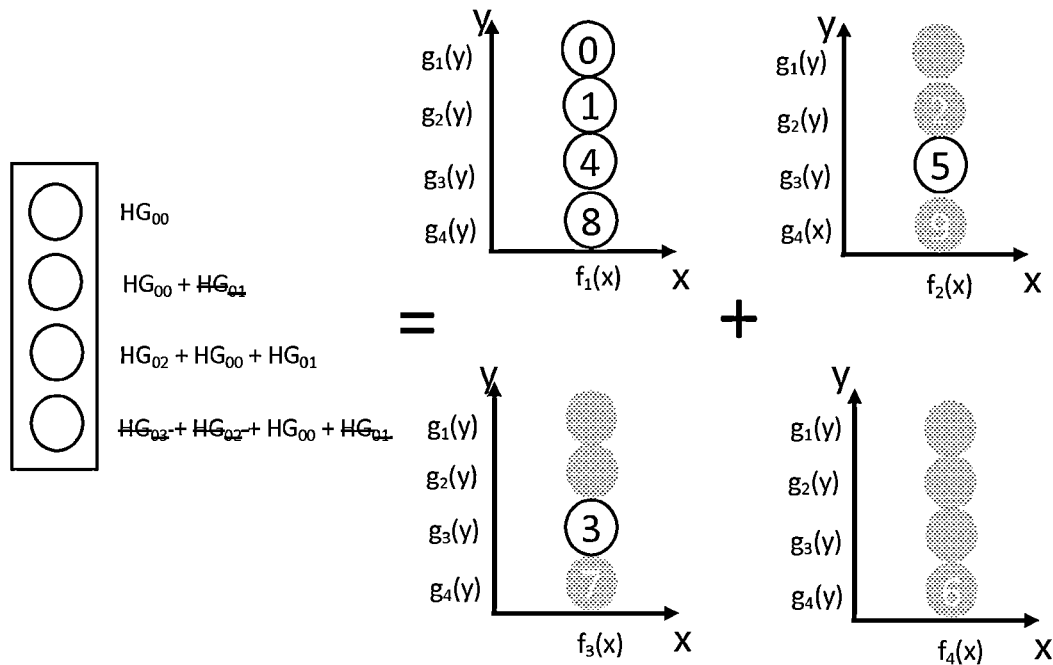
FIG. 9 shows the modal decomposition of an incident radiation of the second application example.

The first conversion T1 is a conversion with separable variables. Thus, FIG. 9 shows the first mode family with separable variables in a plane of the input stage that allows the incident radiation to be decomposed, and the functions $g_j$ forming the generating functions of this family. This plane of the input stage is provided with a Cartesian input coordinate (x,y). The unused modes of this family are shown shaded grey in FIG. 9. The arrangement in a square is shown in FIG. 8 in the same coordinate (x,y) of the modes, all Gaussian, that compose the second family with separable variables of this first transformation T1 and also the generating functions $f'_i$, $g'_j$.

The second conversion T2 is not a conversion with separable variables, but forms a rearrangement of the Gaussian modes of the second family of the first transformation in the form of a square in a second coordinate (x', y') in an intermediate plane. This second coordinate is rotated by 45° relative to the first coordinate in which the first and second families of the first transformation T1 were defined. This rearrangement may be of any type, in other words the Gaussian modes of the second mode family of the first transformation may be rearranged in any position in the square. Thus, in the example shown, modes 4 and 6 have been reversed relative to the order that appeared most natural, in the sense of the displacement distance of these modes in the plane.

Figure 10:
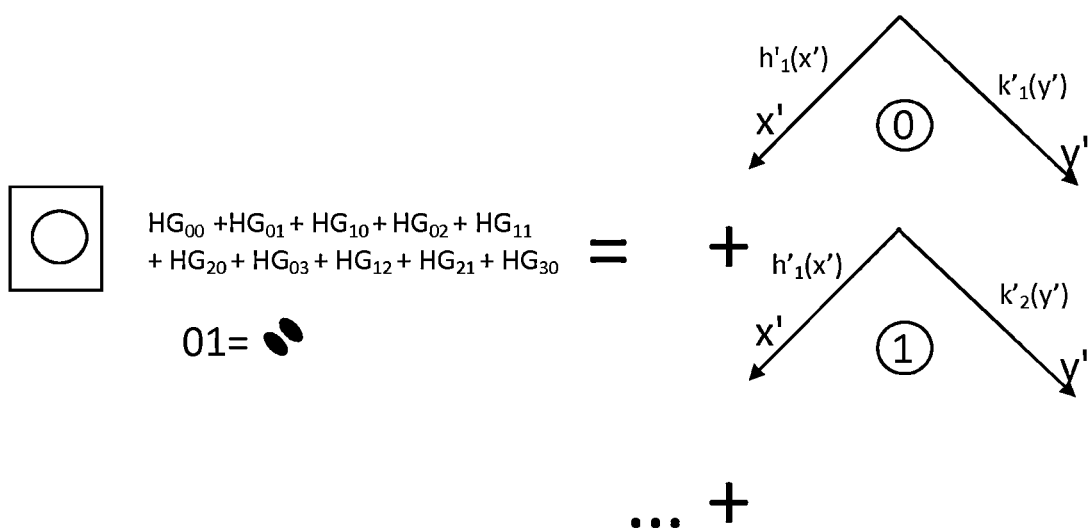
FIG. 10 shows the modal decomposition of a transformed radiation of the second application example.

The arrangement of Gaussian modes in a square forms the first mode family of the third transformation T3. The generating functions $h_i$, $k_j$ have been shown in FIG. 8, showing that this first family does indeed have separable variables. FIG. 10 therefore shows the second mode family with separable variables in a plane of the output stage, and the functions $h'_i$, $k'_j$ forming the generating functions of this family. This plane of the output stage is provided with a Cartesian input coordinate (x',y') identical to that of the plane in which the first mode family of the third transformation was defined. All the modes are spatially superimposed and the unused modes of this family are shaded grey in FIG. 9.

The initial problem is therefore modeled by concatenating three transformations T1, T2, T3, the first and third transformations being transformations linking first families with separable variables to second families with separable variables. These transformations may therefore be implemented with a small number of phase masks, five masks in this case. The second transformation T2 rearranges the mode families between the other two conversions T1, T3, and in this case also allows the modes manipulated by the first transformation to be oriented at 45° to those manipulated by the third transformation. This second transformation T2 may be implemented by additional masks, for example, two to four masks.

A digital optimization method presented earlier is applied to establish the phase shifts of each of the phase masks allowing each useful mode of the fiber bundle to be transformed to modes of the multimode output fiber.

To conclude, it has been shown that a transformation performed by an MPLC device matched the modes of a first mode family with those of a second mode family, both families having separable spatial variables and the modes matched having the same index, could be implemented by a small number of phase masks.

The constraints imposed on the two mode families and on the correspondence between the modes of these families, leads to an optimization problem of which the solutions form a class of transformations that are simple to perform.

Of course, the invention is not limited to the embodiments described and variants may be applied thereto without departing from the scope of the invention as defined by the claims.

What is claimed is:

1. A multi-plane conversion device of a first light radiation, the device having a conversion block comprising a plurality of optical parts and implementing a plurality of phase masks supported by at least one of the optical parts, the phase masks applying a spatiofrequential phase shift for producing a second light radiation, a predetermined transformation, known as a transformation with separable variables, linking N modes of index $\{i, j\}_k$, $1<=k<=N$, of a first used mode family with separable spatial variables (x,y) describing the first light radiation in a first transverse plane with N modes of the same index $\{i, j\}_k$ $1<=k<=N$, of a second used mode family with separable spatial variables (x,y) describing the second light radiation at a second transverse plane, the N modes of the second used mode family not being Hermite-Gaussian modes and, at the same time, the N modes of the first used mode family not being arranged in the first transverse plane in the form of a triangle.

2. The device of claim 1, further comprising at least one stage for injecting the first and/or the second light radiation into the conversion block and/or extracting the first and/or the second light radiation from the conversion block.

3. The device of claim 2, wherein the at least one stage comprises a bundle of optical fibers arranged in a transverse stage plane, the first transverse plane being the transverse stage plane.

4. The device of claim 3, wherein the bundle of optical fibers for the stage is arranged in the transverse stage plane in the form of a rectangle or square.

5. The device of claim 3, wherein the bundle of optical fibers comprises 81 optical fibers arranged and assembled in a square made up of nine columns and nine rows.

6. The device of claim 2, wherein the at least one stage comprises at least one multimode fiber.

7. The device of claim 1, wherein at least one of the optical parts supports at least one phase mask with separable spatial variables (x, y).

8. The device of claim 1, wherein the optical parts comprise two reflecting optical parts arranged facing one another, the phase masks being supported by one and/or another of the two reflecting optical parts.

9. The device of claim 8, wherein the two reflecting optical parts are formed of a microstructured phase plate and a mirror, and the phase masks are supported by the microstructured phase plate.

10. The device of claim 1, wherein the plurality of phase masks comprises 11 phase masks.

* * * * *